(12) United States Patent
Murasato et al.

(10) Patent No.: US 10,005,370 B2
(45) Date of Patent: Jun. 26, 2018

(54) CHARGING APPARATUS FOR VEHICLE

(71) Applicant: TOYOTA JIDOSHA KABUSHIKI KAISHA, Toyota-shi, Aichi-ken (JP)

(72) Inventors: Kenji Murasato, Toyota (JP); Eiji Kitano, Toyota (JP); Yasuo Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 15/300,849

(22) PCT Filed: Apr. 16, 2015

(86) PCT No.: PCT/IB2015/052782
§ 371 (c)(1),
(2) Date: Sep. 30, 2016

(87) PCT Pub. No.: WO2015/162526
PCT Pub. Date: Oct. 29, 2015

(65) Prior Publication Data
US 2017/0036559 A1 Feb. 9, 2017

(30) Foreign Application Priority Data
Apr. 22, 2014 (JP) ................................. 2014-088102

(51) Int. Cl.
B60L 11/18 (2006.01)

(52) U.S. Cl.
CPC ....... B60L 11/1844 (2013.01); B60L 11/1811 (2013.01); B60L 11/1816 (2013.01);
(Continued)

(58) Field of Classification Search
CPC .............. B60L 11/1844; B60L 11/1816; B60L 2210/10; B60L 11/1811; B60L 11/1868; B60L 2240/527; Y02T 90/121; Y02T 90/14; Y02T 10/7241; Y02T 90/127; Y02T 10/7216; H01M 10/44; H01M 10/441;
(Continued)

(56) References Cited

U.S. PATENT DOCUMENTS 8,466,655 B2 *   6/2013   Mitsutani ............. B60W 20/50
                                                                  320/104
8,604,751 B2 * 12/2013   Mitsutani ............. B60W 20/50
                                                                  320/109
(Continued)

FOREIGN PATENT DOCUMENTS

JP    2006-129619 A    5/2006
JP    2011-015520 A    1/2011
(Continued)

Primary Examiner — Ryan Johnson
(74) Attorney, Agent, or Firm — Oliff PLC (57) ABSTRACT

A charging apparatus is for a vehicle and the charging apparatus includes a charging port, an AC-DC converter, a capacitor, a DC-DC conversion unit and an electronic control unit. The electronic control unit is configured to reduce an output current from the DC-DC conversion unit to at least one of the electric power storage device or the auxiliary load in response to a deterioration from a predetermined state of a state of the electric power supplied from the outside of the vehicle to the charging port.

4 Claims, 7 Drawing Sheets

(52) U.S. Cl.
CPC ....... *B60L 11/1868* (2013.01); *B60L 2210/10* (2013.01); *B60L 2210/30* (2013.01); *Y02E 60/721* (2013.01); *Y02T 10/7005* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
CPC ........... H02M 2001/0022; H02J 7/0077; H02J 7/022; H02J 7/045; H02J 7/008
See application file for complete search history.

(56) References Cited

U.S. PATENT DOCUMENTS

| | | | |
|---|---|---|---|
| 8,773,065 B2 * | 7/2014 | Ang | B60L 11/1811 320/104 |
| 2006/0108986 A1 | 5/2006 | Funabashi et al. | |
| 2010/0289451 A1 | 11/2010 | Tuffner et al. | |
| 2012/0109443 A1 | 5/2012 | Takahashi et al. | |
| 2012/0249066 A1 | 10/2012 | Ichikawa | |
| 2014/0042983 A1 | 2/2014 | Yamaguchi et al. | |

FOREIGN PATENT DOCUMENTS

| | | |
|---|---|---|
| JP | 2011-072088 A | 4/2011 |
| JP | 2013-247836 A | 12/2013 |

* cited by examiner

CHARGING APPARATUS FOR VEHICLE

BACKGROUND OF THE INVENTION

1. Field of the Invention

The invention relates to a charging apparatus for a vehicle and, more particularly, to a charging apparatus for a vehicle that is configured to allow charging of an automotive electric power storage device from the outside of the vehicle.

2. Description of Related Art

Electric cars and plug-in hybrid cars are configured to allow charging of the automotive batteries from the outside of the vehicles. Japanese Patent Application Publication No. 2011-015520 (JP 2011-015520 A) discloses a charging system for a vehicle. The charging system for a vehicle is configured to include a vehicle on which a battery is mounted, an external electric power supply, and a charging cable that connects the external electric power supply and the vehicle to each other. The vehicle includes a charging port (charging inlet), a main battery, an auxiliary battery, and a charger that is disposed between the main battery and the charging port.

In the charger, AC electric power that is provided from the outside of the vehicle is converted into DC electric power by an AC-DC converter. The DC electric power is smoothed by a capacitor. According to the technique that is disclosed in JP 2011-015520 A, the electric power that is supplied from the outside is stable to the point of allowing the smoothing by the capacitor.

However, the AC electric power that is provided from the outside of the vehicle may be of various types. For example, the input electric power supply voltage and the electric power supply frequency may vary in the case of electric power from power generators which are placed outdoors and electric power from commercial electric power supplies in countries with unstable electric power supply and the like. When the electric power supply voltage drops or the electric power supply frequency is lowered, the voltage of the capacitor that is DC-converted may drop and charging by the charger stop. When the charger stops charging, the vehicle may not be able to travel a scheduled distance. In addition, the electric power storage device of the vehicle may be used as an emergency electric power supply in some cases. In order to prepare for these cases, it is preferable that the electric power storage device is charged with as much electric power as possible.

SUMMARY OF THE INVENTION

The invention provides a charging apparatus for a vehicle that is capable of continuing charging even when fluctuations occur in the state of electric power supplied from the outside such as the electric power supply voltage or the electric power supply frequency.

A charging apparatus of the present invention is for a vehicle. The charging apparatus includes a charging port, an AC-DC converter, a capacitor, a DC-DC conversion unit and an electronic control unit. The AC-DC converter is configured to convert AC electric power received from the charging port into DC electric power. The capacitor is configured to smooth the DC electric power converted by the AC-DC converter. The DC-DC conversion unit is configured to convert a voltage of the capacitor and supply the voltage to at least one of an electric power storage device or an auxiliary load. The electronic control unit is configured to control the DC-DC conversion unit. The electronic control unit being configured to reduce an output current from the DC-DC conversion unit to at least one of the electric power storage device or the auxiliary load in response to a deterioration from a predetermined state of a state of the electric power supplied from the outside of the vehicle to the charging port.

Herein, the case of "the deterioration of the state of the electric power supplied from the outside of the vehicle to the charging port from a predetermined state" may include a case where "the frequency of the AC electric power supplied from the outside of the vehicle to the charging port is less than a predetermined threshold", a case where "the voltage of the AC electric power supplied from the outside of the vehicle to the charging port is less than a predetermined threshold", and a case where "the voltage of the smoothing capacitor is less than a predetermined threshold".

According to this configuration, the electric power supply is not immediately stopped even in a case where the state of the electric power supplied from the outside of the vehicle to the charging port is not good, for example, a case where the voltage drops or the frequency fluctuates. This configuration increases the possibility of continuation of the charging of the electric power storage device or the electric power supply to the auxiliary load even with little electric power. In other words the charging of the electric power storage device and the electric power supply to the auxiliary load are unlikely to stop even in a case where the state of the electric power supplied from the outside is poor. Accordingly, an unexpected reduction in traveling distance may be unlikely to occur and a case which the auxiliary load cannot be used may be unlikely to occur.

The charging apparatus may further include a sensor. The sensor may be configured to detect a frequency of the AC electric power supplied from the outside of the charging port. The electronic control unit may be configured to reduce the output current from the DC-DC conversion unit to at least one of the electric power storage device or the auxiliary load in a case where the frequency detected by the sensor is less than a predetermined threshold.

According to this configuration, the charging apparatus for the vehicle can continue the electric power supply to any one of the electric power storage device or the auxiliary load, by reducing the output current, in a case where the frequency of the AC electric power supplied from the outside drops.

The sensor may be configured to detect a voltage of the AC electric power supplied from the outside to the charging port. The electronic control unit may be configured to reduce the output current from the DC-DC conversion unit to at least one of the electric power storage device or the auxiliary load in a case where the voltage detected by the sensor is less than a predetermined threshold.

According to this configuration, the charging apparatus for the vehicle can continue the electric power supply to any one of the electric power storage device or the auxiliary load by reducing the output current in a case where the voltage of the AC electric power supplied from the outside drops.

The sensor may be configured to detect a voltage of the capacitor. The electronic control unit may be configured to reduce the output current from the DC-DC conversion unit to at least one of the electric power storage device or the auxiliary load in a case where the voltage detected by the sensor is less than a predetermined threshold For example, the voltage of the capacitor drops in a case where the voltage of the AC electric power supplied from the outside drops and a case where the frequency of the AC electric power supplied from the outside drops. Accordingly, the charging apparatus for the vehicle can continue the electric power supply to any one of the electric power storage device or the auxiliary load by detecting the drop in the voltage of the capacitor and reducing the output current.

Further, the DC-DC conversion unit may include a first DC-DC converter and a second DC-DC converter. The first DC-DC converter may be configured to convert a voltage of the capacitor and supply the voltage to the electric power storage device. The second DC-DC converter may be configured to convert a voltage of the capacitor and supply the voltage to the auxiliary load. The electronic control unit may be configured to reduce the output current from DC-DC conversion unit to the auxiliary load by stopping the second DC-DC converter during a start of the second DC-DC converter. The electronic control unit may be configured to reduce the output current from the DC-DC conversion unit to the electric power storage device by reducing an output current of the first DC-DC converter when the second DC-DC converter is stopped.

According to this configuration, the charging of the electric power storage device can be continued by stopping the electric power supply to the auxiliary load when the electric power is being supplied to the auxiliary load. The charging of the electric power storage device can be continued while reducing charging electric power to the electric power storage device, when the electric power is not being supplied to the auxiliary load and the state of the electric power supplied from the outside is deteriorated from a predetermined state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Like reference numerals will be used to refer to the same or similar elements in the drawings and description thereof will not be repeated.

Figure 1:
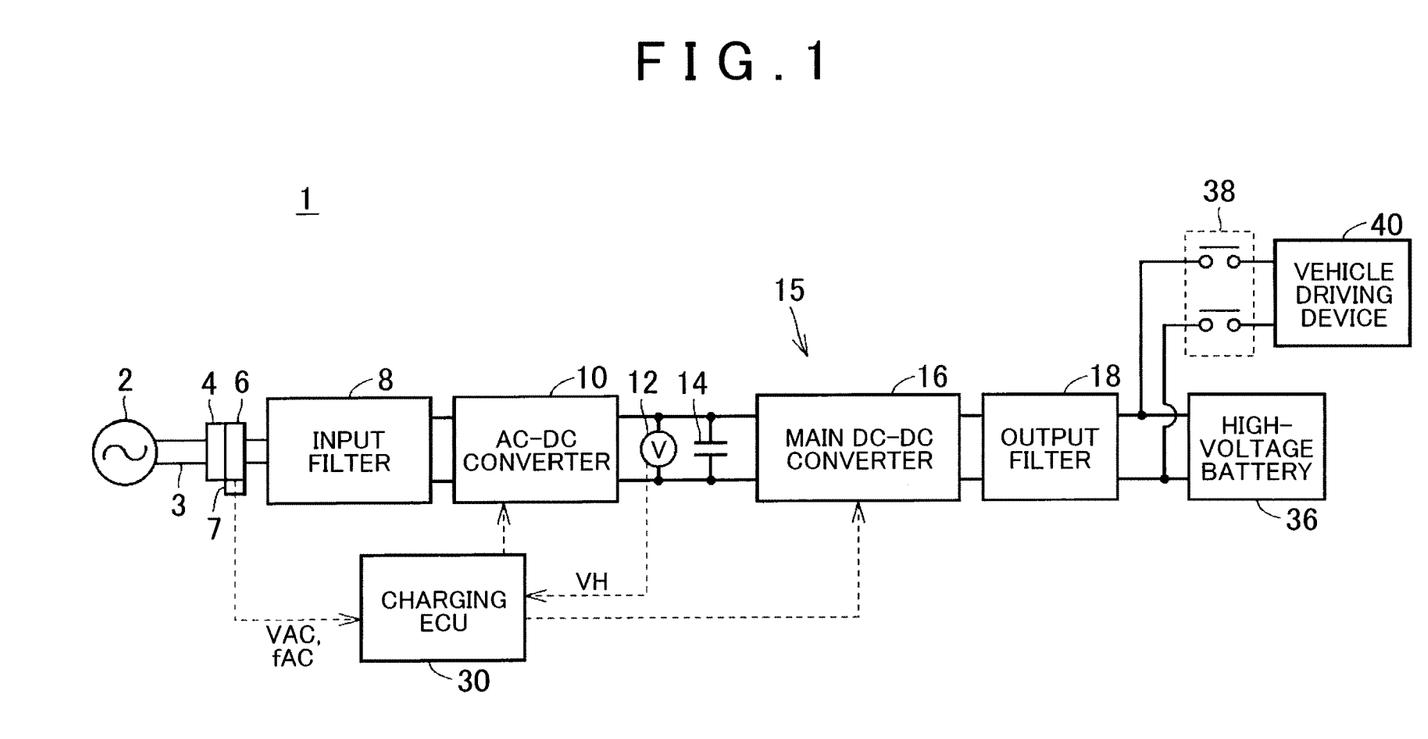
FIG. 1 is a block diagram illustrating the configuration of a charging apparatus for a vehicle according to a first embodiment.

FIG. 1 is a block diagram illustrating the configuration of a charging apparatus for a vehicle according to a first embodiment. Referring to FIG. 1, a charging apparatus 1 for a vehicle includes a charging inlet 6 and an electric power supply sensor 7.

A charging connector 4 is connected to the charging inlet 6, and AC electric power is supplied from an external electric power supply 2 to the charging inlet 6 through a charging cable 3. The electric power supply sensor 7 detects the voltage VAC and the frequency fAC of the AC electric power that is supplied from the outside of the vehicle.

The charging apparatus 1 for the vehicle also includes an input filter 8, an AC-DC converter 10, a voltage sensor 12, a smoothing capacitor 14, a DC-DC conversion unit 15, an output filter 18, and a charging ECU 30. The DC-DC conversion unit 15 includes a main DC-DC converter 16. The voltage sensor 12 is configured to detect the voltage of the smoothing capacitor 14.

The input filter 8 cuts noise of the AC electric power that is input from the external electric power supply 2 and prevents noise from coming in to the external electric power supply 2 from the vehicle. The AC-DC converter 10 converts the AC electric power that is received from the charging inlet 6 to DC electric power and boosts the AC electric power. The capacitor 14 smoothes the DC electric power that is converted by the AC-DC converter 10. The main DC-DC converter 16 converts the voltage of the capacitor 14 into a charging voltage of, for example, approximately 200 V and supplies the voltage to a high-voltage battery 36 through the output filter 18. The output filter 18 cuts switching noise of the main DC-DC converter 16 and the like. The high-voltage battery 36 is connected to a vehicle driving device 40 that includes a motor and the like by a system main relay 38.

The AC electric power that is provided from the external electric power supply 2 may be of various types. The input electric power supply voltage VAC and the electric power supply frequency fAC may vary in the case of electric power from such electric power generators. For example, the external electric power supply 2 may be photovoltaic power generators, wind power generators, and engine power generators which are installed outdoors and electric power from commercial electric power supplies in countries with unstable electric power supply and the like.

Figure 2:
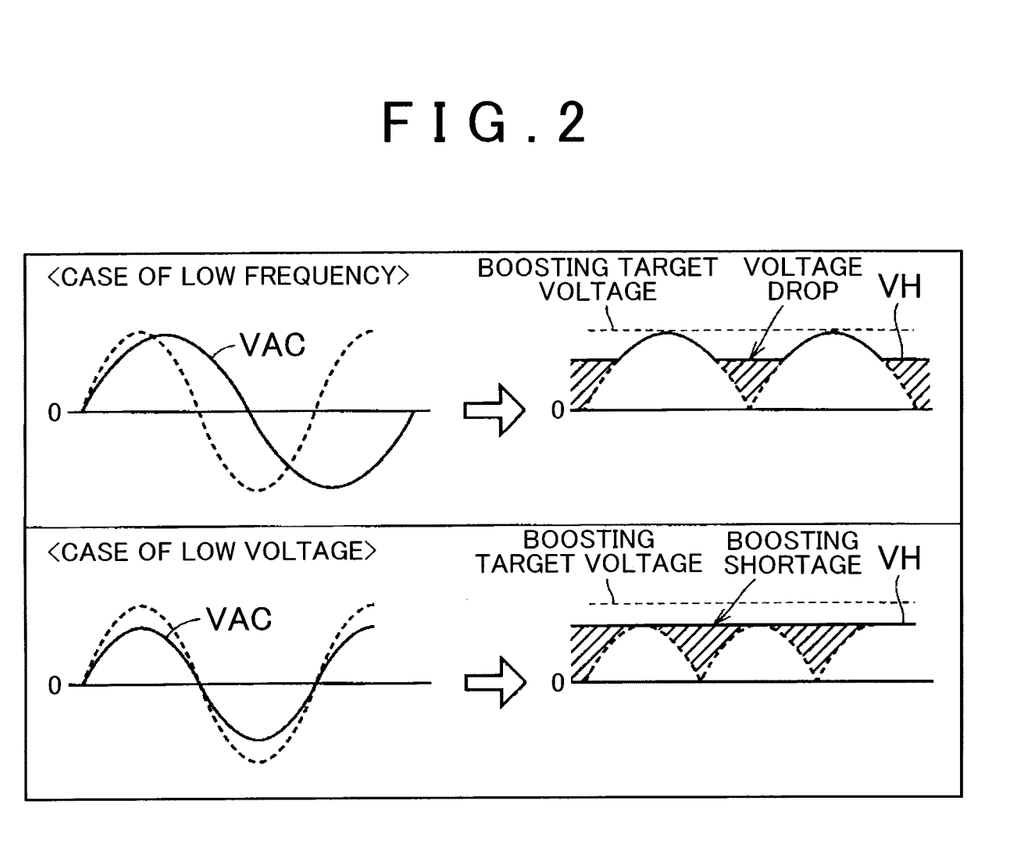
FIG. 2 is a diagram for showing an example of the deterioration of the state of electric power provided from an external electric power supply.

FIG. 2 is a diagram to show an example of the deterioration of the state of the electric power provided from the external electric power supply. Referring to the upper part of FIG. 2, a trough part of a rectified waveform expands and the trough part cannot be sufficiently supplemented by the smoothing capacitor 14 in a case where the frequency is less than a scheduled value. Accordingly, an input voltage VH fluctuates up and down between a peak part and the unsupplementable trough part of the rectified waveform, and the operation of the main DC-DC converter 16 stops.

As illustrated in the lower part, the AC-DC converter 10 is not completely boosted to a target voltage and the required voltage VH cannot be obtained by the overall dropping of the voltage VH, in a case where the voltage is less than the intended value. Even in this case, the operation of the main DC-DC converter 16 stops.

In other words, the voltage VH of the capacitor that is DC-converted drops or fluctuates when the electric power supply voltage VAC drops or the electric power supply frequency fAC decreases. In this case, it may be impossible for the charging apparatus 1 to continue with normal charging.

If the operation of the charging apparatus 1 is immediately stopped in such cases, insufficient charging of the high-voltage battery 36 may block the vehicle from traveling a scheduled distance. In addition, the high-voltage battery 36 may be used as an emergency electric power supply for electric power supply to the outside of the vehicle in some cases. In order to provide against this case, it is preferable that the high-voltage battery 36 is charged with as much electric power as possible.

In this embodiment, the charging ECU 30 reduces an output current from the DC-DC conversion unit 15 to the high-voltage battery 36 in response to the deterioration from a predetermined state of the state of the electric power supplied from the outside of the vehicle to the charging inlet 6. The reduction of the output current can be controlled by, for example, lowering the duty ratio of switching of the main DC-DC converter 16. This control suppresses the drop of the voltage VH, and thus the charging apparatus 1 can continue charging the high-voltage battery 36.

Figure 3:
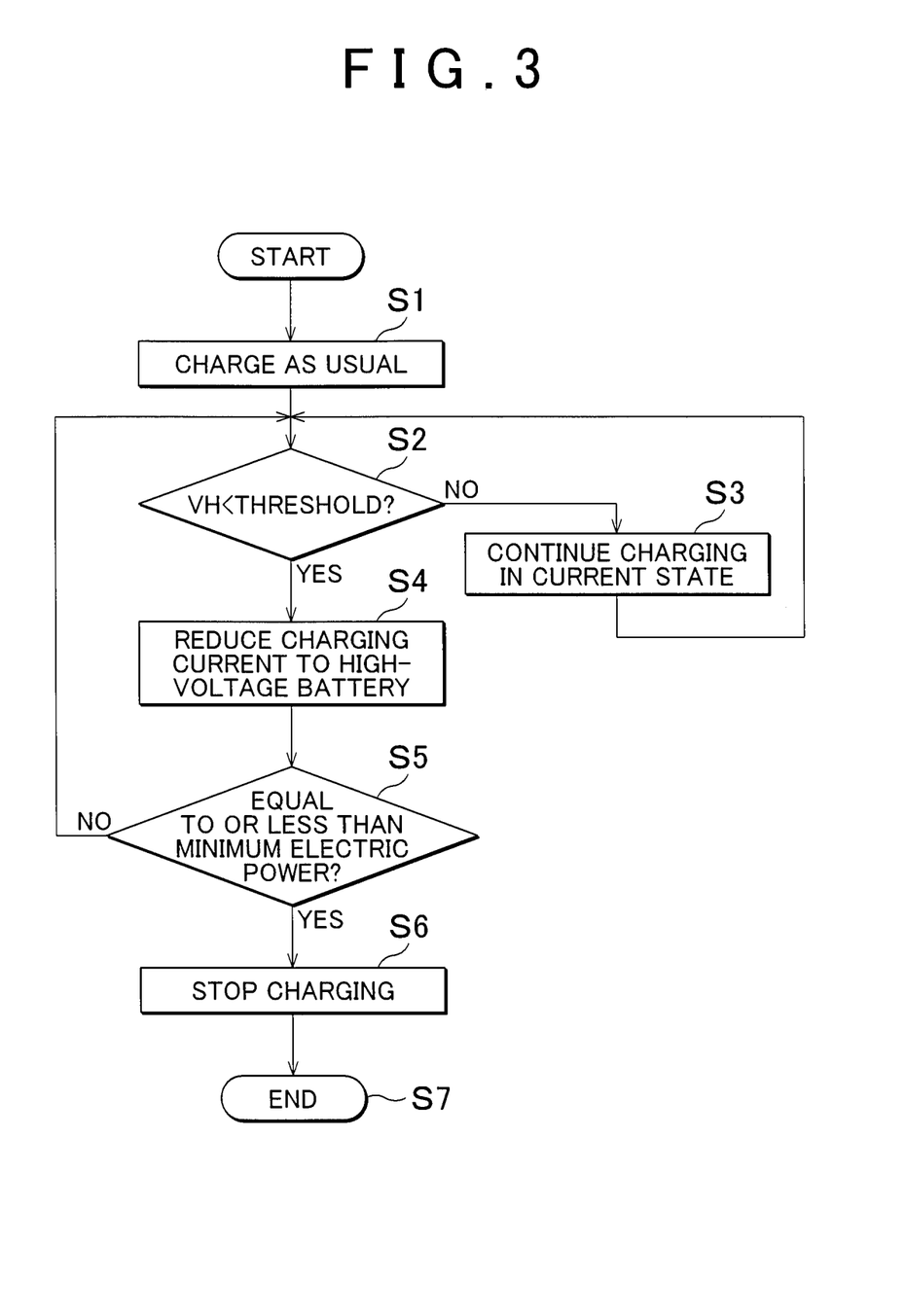
FIG. 3 is a flowchart for showing charging control that is executed by a charging ECU 30 of the first embodiment.

FIG. 3 is a flowchart of charging control that is executed by the charging ECU 30 of the first embodiment. Referring to FIGS. 1 and 3, usual charging without limiting the electric power is executed in Step S1. In Step S2, it is determined that whether or not the voltage VH is dropped from a threshold. In a case where the voltage VH is not dropped from the threshold (NO in Step S2), the processing proceeds to Step S3 and the charging ECU 30 continues charging in the current state.

In a case where the voltage VH is dropped from the threshold (YES in Step S2), the processing proceeds to Step S4 and the charging ECU 30 reduces a charging current for the high-voltage battery 36. In order to reduce the charging current, the charging ECU 30 drops the duty ratio of the switching of the main DC-DC converter 16.

Then, the charging ECU 30 determines in Step S5 whether or not the reduced electric power is equal to or less than the minimum electric power that can be output by the main DC-DC converter 16. In a case where the reduced electric power still exceeds the minimum electric power (NO in Step S5), the processing returns back to Step S2. In a case where the reduced electric power is equal to or less than the minimum electric power (YES in Step S5), the processing proceeds to Step S6. The charging of the high-voltage battery 36 is stopped in Step S6 and the processing is terminated in Step S7.

Figure 4:
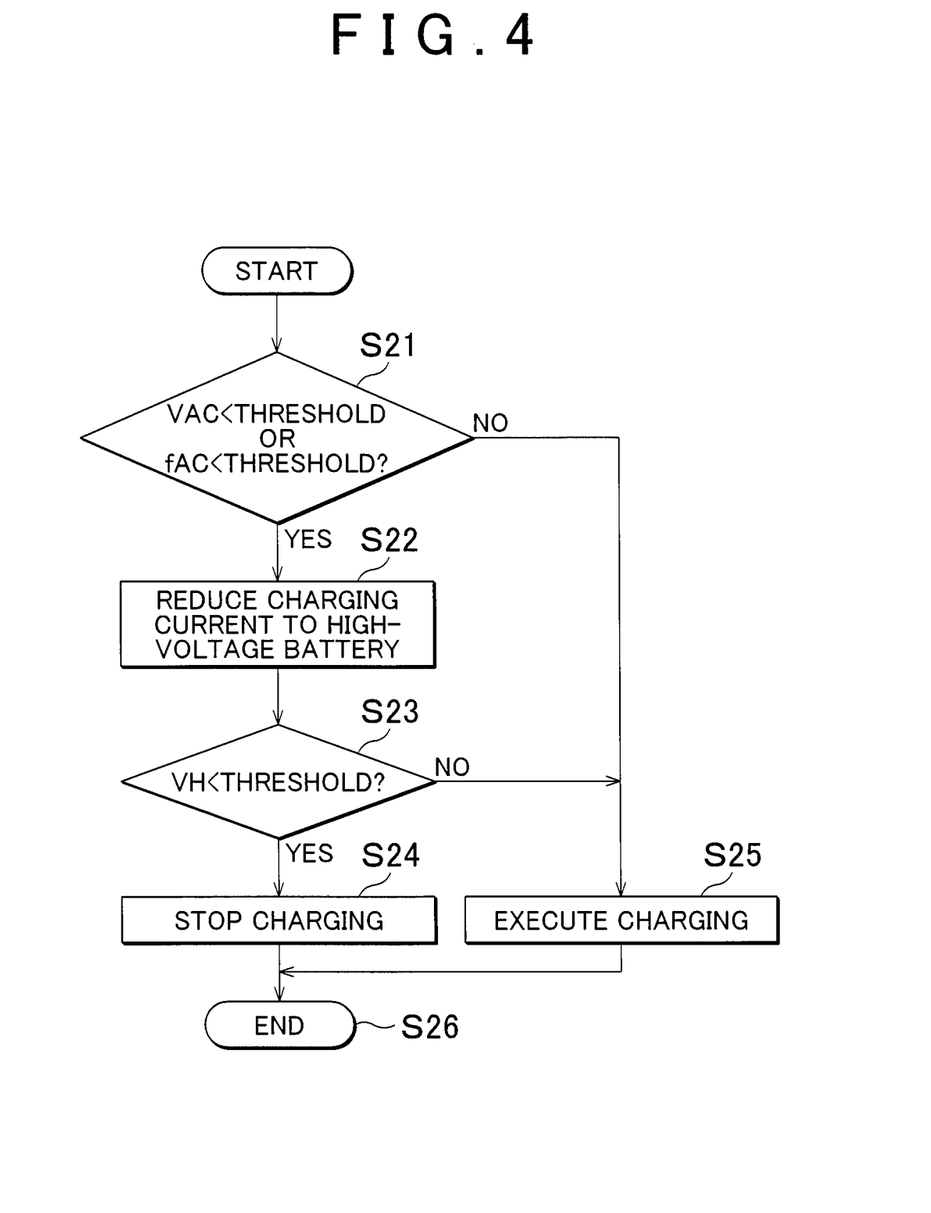
FIG. 4 is a flowchart for showing control by a modification example of the first embodiment.

FIG. 4 is a flowchart showing control of a modification example of the first embodiment. In the example illustrated in FIG. 3, the deterioration of the quality of the electric power supply supplied from the outside is detected by observing the voltage VH. In the example illustrated in FIG. 4, however, the deterioration of the quality of the electric power supply is detected by the electric power supply sensor 7 that is disposed in the charging inlet 6.

Referring to FIGS. 1 and 4, the charging ECU 30 determines, in Step S21, whether or not the condition that the voltage VAC is less than a threshold or the frequency fAC is less than a threshold is satisfied. In a case where the condition is not satisfied (NO in Step S21), the processing proceeds to Step S25 and the usual charging (charging without limiting the electric power) is executed. In a case where the condition is satisfied (YES in Step S21), the processing proceeds to Step S22.

In Step S22, the charging current for the high-voltage battery 36 is reduced. In order to reduce the charging current, the charging ECU 30 drops the duty ratio of the switching of the main DC-DC converter 16.

Next, the charging ECU 30 determines, in Step S23, whether or not the voltage VH is dropped from a threshold. In a case where the voltage VH is not dropped from the threshold (NO in Step S23), the processing proceeds to Step S25 and the charging is executed in a state where charging electric power is reduced.

In a case where the voltage VH is dropped from the threshold (YES in Step S23), the processing proceeds to Step S24 and the charging of the high-voltage battery 36 is stopped.

As illustrated in FIG. 4, it may be determined whether or not to reduce the charging current from the result of the detection of the voltage and the frequency of the electric power provided from the outside. Even in this case, it is highly likely that the charging of the battery continues.

In the first embodiment, a case where the charging apparatus supplies the electric power only to the high-voltage battery 36 has been described. In some cases, however, charging of an auxiliary battery may be performed or partial electric power supply to an auxiliary load may be performed during the charging of the high-voltage battery 36. Control in this case will be described in a second embodiment.

Figure 5:
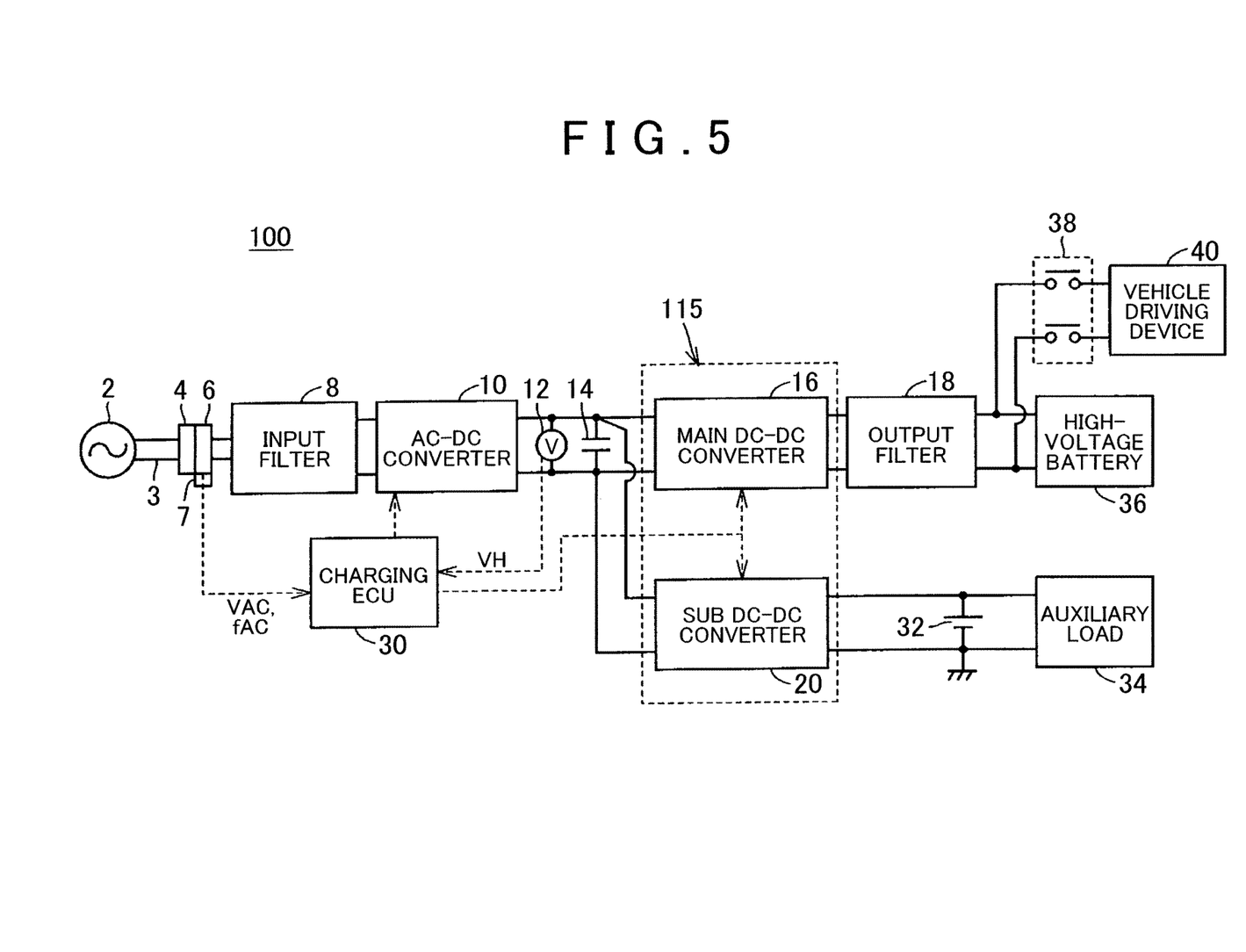
FIG. 5 is a block diagram illustrating the configuration of a charging apparatus for a vehicle according to a second embodiment.

FIG. 5 is a block diagram illustrating the configuration of a charging apparatus for a vehicle according to the second embodiment. A charging apparatus 100 for a vehicle that is illustrated in FIG. 5 includes a DC-DC conversion unit 115 instead of the DC-DC conversion unit 15 in the configuration of the charging apparatus 1 illustrated in FIG. 1. The DC-DC conversion unit 115 is configured to be capable of converting the voltage of the capacitor 14 and supplying the converted voltage to at least one of the high-voltage battery 36 or an auxiliary load 34. Specifically, the DC-DC conversion unit 115 includes the main DC-DC converter 16 and a sub DC-DC converter 20 that can be controlled independently of each other.

The main DC-DC converter 16 converts the voltage of the capacitor 14 into a charging voltage and supplies the charging voltage to the high-voltage battery 36 through the output filter 18. The sub DC-DC converter 20 converts the voltage of the capacitor 14 and supplies the converted voltage to an auxiliary battery 32 and the auxiliary load 34.

When it comes to the other configuration, the charging apparatus 100 is similar to the charging apparatus 1 illustrated in FIG. 1, and thus description thereof will not be repeated herein.

In this configuration, the drop in the voltage VH may be prevented and the charging of the high-voltage battery 36 may be allowed to continue by limiting the electric power supply to the auxiliary load 34.

The charging ECU 30 reduces an output current from the DC-DC conversion unit 115 to the auxiliary load 34 in response to the deterioration from a predetermined state of the state of the electric power supplied from the outside of the vehicle to the charging inlet 6.

Specifically, the charging ECU 30 reduces the output current from the DC-DC conversion unit 115 to the auxiliary load 34 by stopping the sub DC-DC converter 20 during the start of the sub DC-DC converter 20, and the charging ECU 30 reduces the output current from the DC-DC conversion unit 115 to the high-voltage battery 36 by reducing an output current of the main DC-DC converter 16 when the sub DC-DC converter 20 is stopped. In this manner, the drop in the voltage VH can be prevented.

In this configuration, electric power supply of the ECU or the like that controls a system of the vehicle has to be ensured with the charging of the auxiliary battery 32 given priority over the charging of the high-voltage battery 36 in a case where the voltage of the auxiliary battery 32 is significantly dropped due to discharging.

In a case where the voltage of the auxiliary battery 32 is equal to or less than a lower limit threshold, the charging ECU 30 prevents the voltage VH from dropping and charges the auxiliary battery 32 by reducing the charging current to the high-voltage battery 36 rather stopping the sub DC-DC converter 20.

Figure 6:
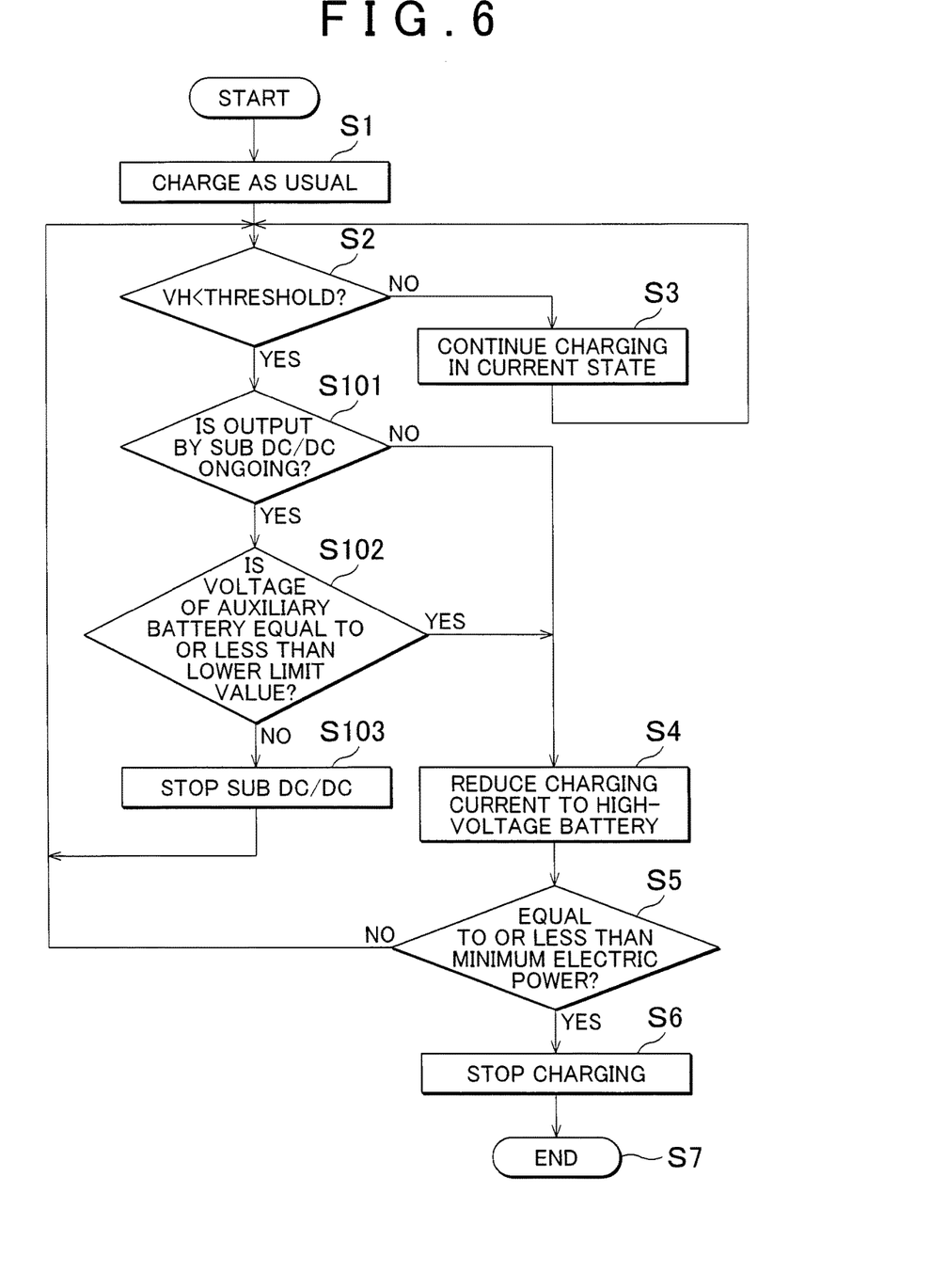
FIG. 6 is a flowchart for showing charging control that is executed by the charging ECU 30 of the second embodiment.

FIG. 6 is a flowchart for showing charging control that is executed by the charging ECU 30 of the second embodiment. The processing along the flowchart that is illustrated in FIG. 6 is the processing along the flowchart that is illustrated in FIG. 3 to which processing from Steps S101 to 103 are added. The processing from Steps S1 to S7 has already been described in FIG. 3, and thus description thereof will not be repeated herein.

In a case where VH<threshold is satisfied in Step S2 (YES in Step S2), the processing proceeds to Step S101 and the charging ECU 30 determines whether or not electric power is being output by the sub DC-DC converter 20. In a case where the electric power is being output by the sub DC-DC converter 20 (YES in Step S101), the processing proceeds to Step S102. In a case where the electric power is not being output by the sub DC-DC converter 20 (NO in Step S101), the processing proceeds to Step S4 and the charging current to the high-voltage battery 36 is reduced.

In Step S102, the charging ECU 30 determines whether or not the voltage of the auxiliary battery 32 is equal to or less than a lower limit value. In a case where the voltage of the auxiliary battery 32 exceeds the lower limit value (NO in Step S102), the charging ECU 30 stops the operation of the sub DC-DC converter 20 in Step S103. Then, electric power consumption is reduced and the voltage VH may be prevented from dropping, and thus the processing proceeds back to Step S2 and the determination of the voltage VH is executed again.

In a case where the voltage of the auxiliary battery 32 is equal to or less than the lower limit value (YES in Step S102), the processing proceeds to Step S4 and the charging current to the high-voltage battery 36 is reduced.

Figure 7:
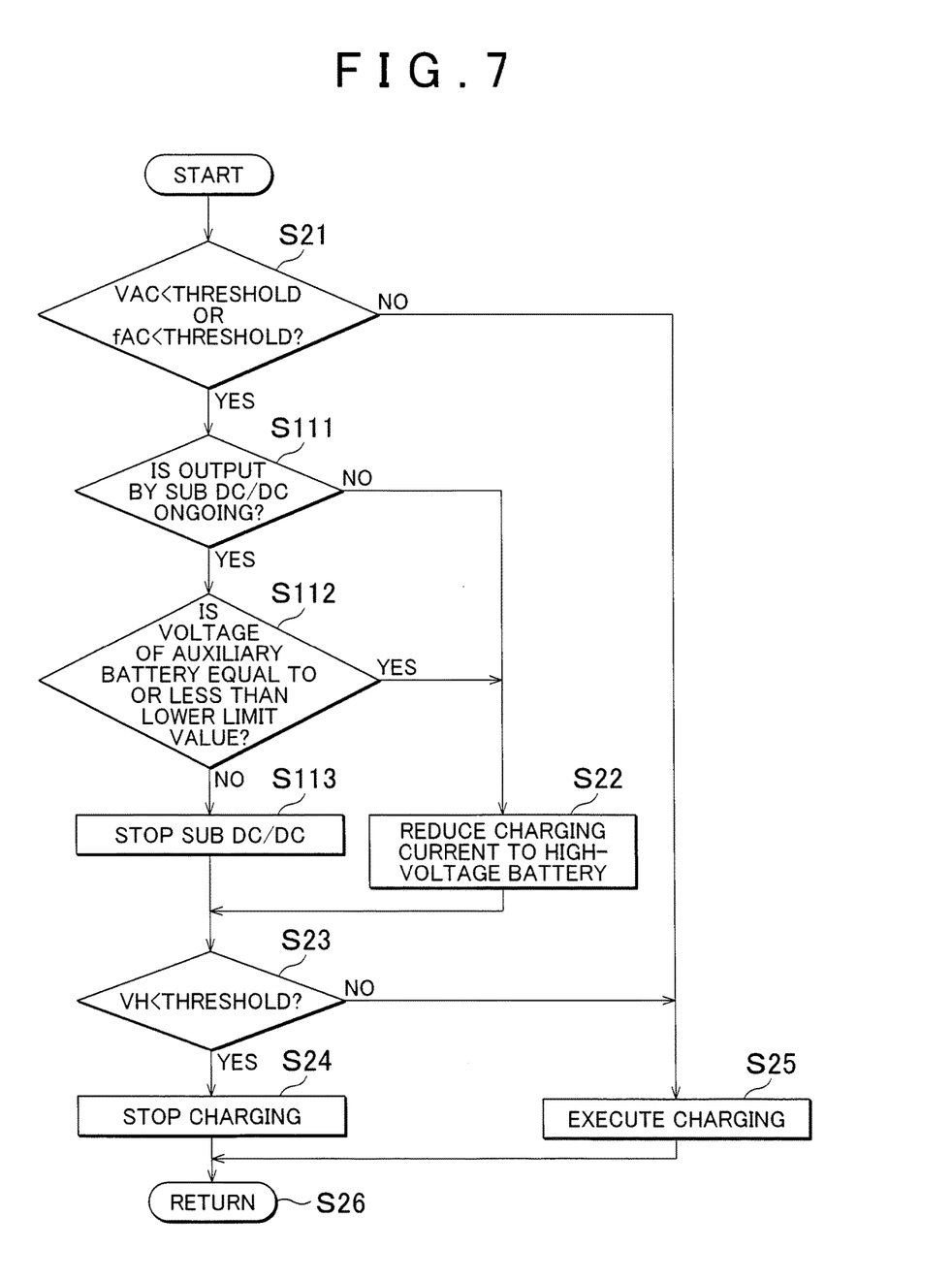
FIG. 7 is a flowchart for showing control by a modification example of the second embodiment.

FIG. 7 is a flowchart for showing control by a modification example of the second embodiment. In the example that is illustrated in FIG. 6, the deterioration of the quality of the electric power supply supplied from the outside is detected by observing the voltage VH. In the example that is illustrated in FIG. 7, however, the deterioration of the quality of the electric power supply is detected by the electric power supply sensor 7 that is disposed in the charging inlet 6.

The processing along the flowchart that is illustrated in FIG. 7 is the processing along the flowchart that is illustrated in FIG. 4 to which processing from Steps S111 to 113 are added. The processing from Steps S21 to S26 has already been described in FIG. 4, and thus description thereof will not be repeated herein.

Referring to FIG. 7, the processing proceeds to Step S111 and the charging ECU 30 determines whether or not electric power is being output by the sub DC-DC converter 20 in a case where the condition regarding the voltage VAC or the frequency fAC is satisfied in Step S21 (YES in Step S21). In a case where the electric power is being output by the sub DC-DC converter 20 (YES in Step S111), the processing proceeds to Step S112. In a case where the electric power is not being output by the sub DC-DC converter 20 (NO in Step S111), the processing proceeds to Step S22 and the charging current to the high-voltage battery 36 is reduced.

In Step S112, the charging ECU 30 determines whether or not the voltage of the auxiliary battery 32 is equal to or less than a lower limit value. In a case where the voltage of the auxiliary battery 32 exceeds the lower limit value (NO in Step S112), the charging ECU 30 stops the operation of the sub DC-DC converter 20 in Step S113. Then, electric power consumption is reduced and the voltage VH may be prevented from dropping, and thus the processing proceeds to Step S23 and the determination of the voltage VH is executed.

In a case where the voltage of the auxiliary battery 32 is equal to or less than the lower limit value (YES in Step S112), the processing proceeds to Step S22 and the charging current to the high-voltage battery 36 is reduced.

In the second embodiment, the charging of the high-voltage battery 36 can be continued by, in principle, stopping the electric power supply to the auxiliary load 34 and preventing the voltage VH from dropping if the electric power is being supplied to the auxiliary load 34 in a case where the state of the electric power supplied from the outside is deteriorated from a predetermined state. If the electric power is not being supplied to the auxiliary load 34, the charging of the high-voltage battery 36 can be continued by reducing the charging electric power to the high-voltage battery 36 and suppressing the drop in the voltage VH.

In a case where the voltage of the auxiliary battery 32 is equal to or less than the lower limit value, priority is given to the charging of the auxiliary battery 32. Accordingly, a vehicle control system start failure attributable to the non-obtainment of the electric power supply of the ECU can be avoided.

The embodiments disclosed herein can be appropriately combined with each other. It should be understood that the embodiments disclosed herein are illustrative in every aspect and do not limit the invention. The scope of the invention is clarified in the claims, not the description above, and any modification within the claims and equivalents thereof are included in the invention.

The invention claimed is:
1. A charging apparatus for a vehicle, the charging apparatus comprising:
a charging port;
an AC-DC converter configured to convert AC electric power received from the charging port into DC electric power;
a capacitor configured to smooth the DC electric power converted by the AC-DC converter;
a DC-DC conversion unit including:
a first DC-DC converter configured to convert a voltage of the capacitor and supply the converted voltage to an electric power storage device; and
a second DC-DC converter configured to convert the voltage of the capacitor and supply the converted voltage to an auxiliary load; and
an electronic control unit configured to control the DC-DC conversion unit, the electronic control unit being configured to reduce an output current from the DC-DC conversion unit to at least one of the electric power storage device or the auxiliary load in response to a deterioration from a predetermined state of a state of the electric power supplied from an outside of the vehicle to the charging port, the electronic control unit being configured to:
reduce the output current from the DC-DC conversion unit to the auxiliary load by stopping the second DC-DC converter during a start of the second DC-DC converter; and
reduce the output current from the DC-DC conversion unit to the electric power storage device by reducing an output current of the first DC-DC converter when the second DC-DC converter is stopped.
2. The charging apparatus according to claim 1, further comprising:

a sensor configured to detect a frequency of the AC electric power supplied from the outside of the vehicle to the charging port, wherein the electronic control unit is configured to reduce the output current from the DC-DC conversion unit to at least one of the electric power storage device or the auxiliary load in a case where the frequency detected by the sensor is less than a predetermined threshold.

3. The charging apparatus according to claim 1, further comprising:

a sensor configured to detect a voltage of the AC electric power supplied from the outside of the vehicle to the charging port, wherein the electronic control unit is configured to reduce the output current from the DC-DC conversion unit to at least one of the electric power storage device or the auxiliary load in a case where the voltage detected by the sensor is less than a predetermined threshold.

4. The charging apparatus according to claim 1, further comprising:

a sensor configured to detect a voltage of the capacitor, wherein the electronic control unit is configured to reduce the output current from the DC-DC conversion unit to at least one of the electric power storage device or the auxiliary load in a case where the voltage detected by the sensor is less than a predetermined threshold.

* * * * *